G. R. WADSWORTH.
ELECTRICALLY OPERATED BRAKE.
APPLICATION FILED MAY 2, 1913.
1,104,586.
Patented July 21, 1914.
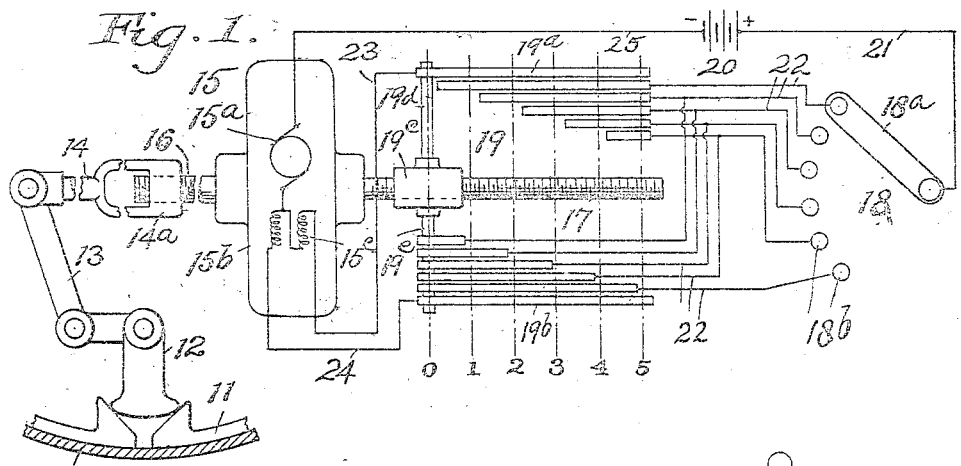
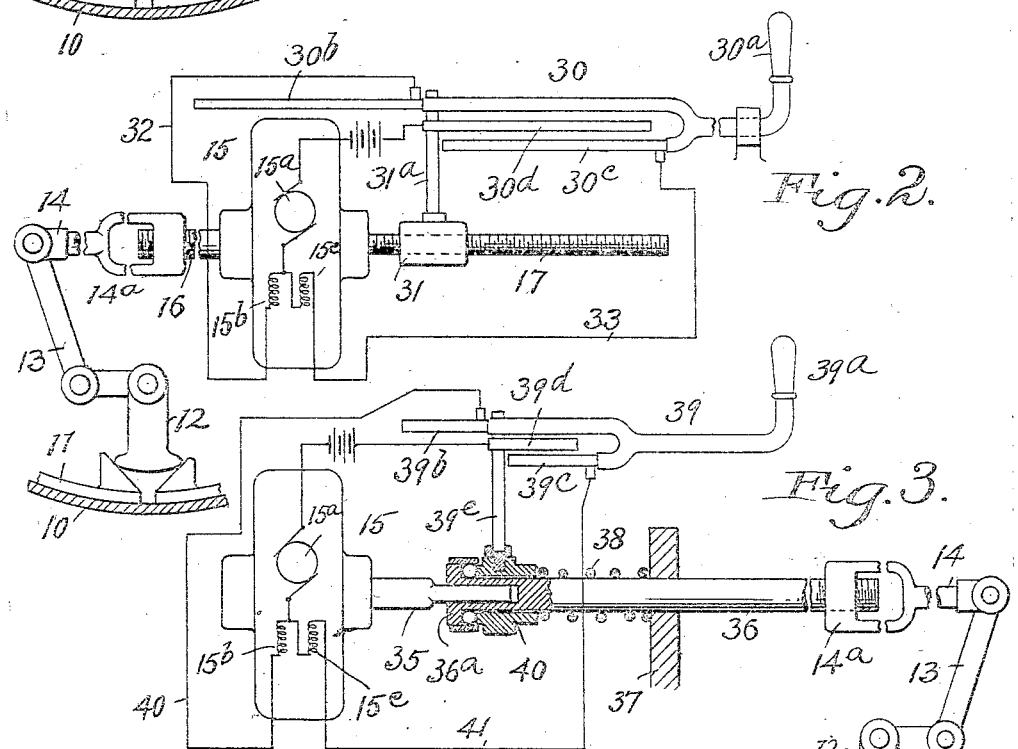
Witnesses.
E. B. Gilchrist
H. E. Hubbard
Inventor
George R. Wadsworth
by Thurston & Kwis
Attys.

UNITED STATES PATENT OFFICE.

GEORGE R. WADSWORTH, OF CLEVELAND, OHIO, ASSIGNOR TO THE PEERLESS MOTOR CAR COMPANY, OF CLEVELAND, OHIO, A CORPORATION OF OHIO.

ELECTRICALLY-OPERATED BRAKE.

1,104,586.

Specification of Letters Patent.  Patented July 21, 1914.

Application filed May 2, 1913. Serial No. 765,034.

*To all whom it may concern:*

Be it known that I, GEORGE R. WADSWORTH, a citizen of the United States, residing at Cleveland, in the county of Cuyahoga and State of Ohio, have invented a certain new and useful Improvement in Electrically-Operated Brakes, of which the following is a full, clear, and exact description.

This invention relates to electrically operated brakes adapted particularly for use on motor vehicles which at present are equipped with hand or foot operated brakes.

One of the objects of the invention is to provide braking apparatus including the brake and operating mechanism, which possesses high efficiency, and which can be operated quickly and much more easily than is the case if the brake is thrown on or off by hand or by the foot of the operator.

Further, the invention aims to provide an electrically operated remote controlled brake, by which graduated brake rod movement or any desired braking action can be obtained, at the will of the operator.

My invention may be briefly summarized as consisting in certain novel combinations and arrangements of parts which will be described in the specification and set forth in the appended claims.

In the drawings wherein I have shown several modifications of my invention, Figure 1 is a view partly diagrammatic, showing a portion of a friction brake, and one form of the brake operating and controlling mechanism; Fig. 2 is a similar view showing a modification of the controlling mechanism, and Fig. 3 is a similar view showing a further modification.

Referring now to the drawings, and first to Fig. 1, it will be observed that the brake includes a drum or ring 10 adapted to be frictionally engaged by a split ring 11, which is normally out of engagement with the member 10, but is adapted to be spread when the brake is to be applied by a bell crank 12, which is connected by a link 13 to a brake rod 14.

The parts so far described may be the same as those usually employed in hand operated brakes. In this case, the brake is adapted to be applied or released, by means of a reversible electric motor 15, which in this instance is provided with an armature 15ª and two oppositely wound field windings 15ᵇ and 15ᶜ, one of which is adapted to be utilized when the motor is operated in one direction to apply the brake, or to increase braking action, and the other of which is adapted to be utilized when the motor is operated in the reverse direction to release the brake or to decrease braking action. The motor shaft is provided with two threaded extensions 16 and 17, the former of which is engaged by a nut 14ª on the end of the brake rod 14, which nut is adapted to travel along the shaft to move the brake member 11 either into or out of engagement with the member 10.

In connection with the parts so far described, I employ a system by which the motor can be controlled from a remote point, and by which a variable or gradual braking action can be obtained. This control system includes two switches 18 and 19, the former of which is adapted to be manually operated by the operator, and the second of which is operated by the motor itself. The switch 18 includes a movable switch member or arm 18ª which is connected to one terminal of a battery 20 by a conductor 21, and it includes also a series of contact points or terminals 18ᵇ, over which the switch arm or movable switch member 18ª is adapted to be moved. The switch 19 in this case includes two series of contacts 19ª and 19ᵇ which are connected by suitable conductors 22 to the terminals of switch 18, and the said switch 19 also includes a movable switch member including a nut 19ᶜ adapted to travel back and forth along the threaded shaft 17, and two contacts 19ᵈ and 19ᵉ, the former of which is adapted to engage the series of contacts 19ª and the latter of which is adapted to engage the series of contacts 19ᵇ. It will be observed that the contacts of each series 19ª and 19ᵇ are of graduated, or successively varying lengths, the contacts of series 19ª gradually decreasing in length from the uppermost to the lowermost, and the contacts of series 19ᵇ gradually increasing in length from the uppermost to the lowermost. It will be observed also that the uppermost or longest contact of series 19ª is connected by conductor 23 to one terminal of field winding 15ᶜ; the next to the longest or the second contact 19ª (counting from the top) is connected to the first terminal of switch 18, or to that terminal corresponding to the "off" position of switch arm 18ª; the third contact $19^a$ and the first contact $19^b$ are connected to the second terminal of switch 18; the fourth contact $19^a$ and the second contact $19^b$ are connected to the third terminal of switch 18; the fifth contact $19^a$ and the third contact $19^b$ are connected to the fourth terminal of switch 18; the sixth contact $19^a$ and the fourth contact $19^b$ are connected to the fifth terminal of switch 18; the fifth contact $19^b$ is connected to the sixth and last terminal $18^b$, and the sixth and last contact $19^b$ is connected by a conductor 24 to the field winding $15^b$. As before stated, one terminal of the battery 20 is connected by conductor 21 to the switch arm $18^a$. The second terminal of this battery is connected by conductor 25 to one of the brushes of the motor, and the other brush of the motor is connected to both field windings $15^b$ and $15^c$.

With the arrangement above described, the operator not only controls the brake operating motor from a remote point by a simple manipulation of the switch 18, but he is enabled to obtain a variable braking action, or a variable brake rod movement. In fact, he can select any one of a series of brake rod movements, the number in the series depending upon the number of points or terminals in the switch 18. Suppose the operator desires a braking action or a brake rod movement corresponding to the movement of the switch arm to the third terminal. By a movement of the switch arm to this terminal, the motor is started in the direction to apply the brake. The battery and motor circuit is as follows:—from the positive terminal of the battery 20, by conductor 21 to switch arm 18, from the third switch terminal $18^b$ by one of the conductors 22, to the third contact of series $19^b$ of switch 19, by movable switch contact $19^e$ to the sixth contact $19^b$, by conductor 24 to field winding $15^b$; thence through the armature of the motor, and by conductor 25 to the negative side of the battery. The motor continues to revolve and to move the brake rod until the movable contact $19^e$ rides off of the third contact $19^b$, counting from the top, when the motor will stop, for the reason that the circuit is broken when the contact $19^e$ leaves said contact $19^b$. If the operator now desires to release the brake entirely, the switch arm is moved to off position,—in which event, the motor is immediately rotated in the reverse direction, and the circuit is now as follows:—from the positive side of the battery to the switch arm, from the first terminal $18^b$ by conductor 22 to the second (counting from the top) contact $19^a$ of switch 19, by a movable contact $19^d$ to the first or uppermost contact $19^a$, and thence by conductor 23 to field winding $15^c$; thence through the armature and by conductor 25 to the negative side of the battery. The motor continues to revolve in this direction until the movable contact $19^d$ passes beyond or off of said second contact $19^a$, or when the nut $19^e$ and the contacts $19^d$ and $19^e$ reach their previous and normal position. It will be understood also that the operator can in a similar manner, by moving the switch arm $18^a$ back and forth from one contact terminal to another, either increase or decrease the braking action.

In Fig. 2, I have shown a modification in the controlling mechanism by which substantially the same results above described are obtained by somewhat simpler switching apparatus. In this case, the brake is the same as in the first instance, and as before, I use a reversible electric motor with the two field windings which are differentially or oppositely wound. Instead of two separate and distinct switches, I here utilize a single switch which may be designated as a whole by the reference character 30. This switch includes a manually operable member $30^a$ which is provided with two rather long contact strips or members $30^b$ and $30^c$, which are insulated from each other and are displaced in the direction in which the switch is to be moved, in such a way that there is a slight space between their adjacent ends. Also these contacts are spaced apart laterally and a long stationary contact strip or member $30^d$ is between them. As in the first instance, the motor is provided with two threaded extensions 16 and 17, the former of which engages a nut $14^a$ on the brake rod 14, and as in the first instance, the threaded shaft extension 17 operates a movable switch member including a nut 31, and a movable contact member $31^a$ which is carried by said nut. Normally, or when the brake is off, said contact $31^a$ lies between the adjacent ends of the two contacts $30^b$ and $30^c$, and this contact $31^a$ is at all times in engagement with the stationary contact $30^d$. When the brake is to be applied or released, said contact $31^a$ is adapted to engage one or the other of the two contact strips $30^b$ and $30^c$. It will be observed that one of the brushes of the motor is connected to one side of the battery, and that the other side or terminal of the battery is connected to stationary contact strip $30^d$. It will be observed also that movable contact strip $30^b$ is connected by conductor 32 to the field winding $15^b$, and that movable contact strip $30^c$ is connected by conductor 33 to the field winding $15^c$. Normally, the parts of the switch occupy the positions shown in Fig. 2. If the operator desires to apply the brake, the switch member $30^a$ is moved to the right, (as the same is viewed in Fig. 2), a certain distance depending upon the amount of braking action desired. The motor is then started and continues to revolve until the movable contact $31^a$ rides off of the contact $30^b$, when the motor will stop.

When the operator wishes to release the brake, either partially or wholly, he will shift the movable switch member to the left, and the motor will immediately revolve in the reverse direction, and will continue to revolve in that direction until the contact 31ª rides off of the contact strip 30ᶜ. When the brake is being released, and the motor is being revolved in said reverse direction, current passes through the winding 15ᶜ, whereas when the motor is rotating in the forward direction to apply the brake, current is passing through the field winding 15ᵇ. With this construction, the operator can obtain any desired brake rod movement, and can cause the brake to be applied or released as desired, and to any extent desired within the limits of the apparatus. One of the advantages of this arrangement over that first shown is that the operator is not limited to any predetermined number or series of brake rod movements.

In the modification illustrated in Fig. 3, there is shown a construction which possesses the advantages of the prior constructions, but has the additional advantage that any desired braking action, as distinguished from brake rod movement, can be obtained by movement of the switch, regardless of any inequalities or wear on any of the parts of the brake. In this case, the motor has a single shaft extension 35. This extension 35 rotates a threaded shaft 36 which is connected with the shaft extension 35 in a manner such that the shaft 36 may move endwise relative to the shaft extension 35. In this case, this is accomplished by providing on the end of the shaft extension 35, a squared portion which fits into a correspondingly shaped socket in the end of the shaft 36 in such a way that a sliding fit is obtained. The shaft 36 is engaged by the nut 14ª of the brake rod 14 which is connected to and operates the brake, as in the instances first described, the same reference characters designating corresponding parts in Figs. 1, 2 and 3, as far as the brake mechanism is concerned. Between a shoulder or enlargement 36ª of the shaft 36, and a fixed abutment 37 is a coil spring 38, which tends to resist endwise movement of the shaft 36 or movement of the brake rod, and is compressed or loaded when the brake is applied. In the control of the brake operating motor, I utilize a switch 39 which is similar to the switch 30 of the modification shown in Fig. 2. This switch 39 includes a movable switch arm 39ª carrying two adjustable or movable contact strips 39ᵇ and 39ᶜ, which are displaced endwise, and are on opposite sides of an intermediate stationary contact strip 39ᵈ. The contact strip 39ᵇ is connected by conductor 40 to the field winding 15ᵇ, and contact strip 39ᶜ is connected by conductor 41 to the field winding 15ᶜ. The positive terminal of the battery is connected to the stationary contact strip 39ᵈ. A motor operated contact member 39ᵉ which coöperates with the contact strips 39ᵇ, 39ᶜ, and 39ᵈ, is secured to a sleeve 40 which loosely surrounds the shaft 36 so as to move backwardly and forwardly with the shaft 36 but not to turn therewith. In this instance, the sleeve 40 is arranged between the spring 38 and roller bearings, which engage a shoulder 36ª on the end of shaft 36. In this instance, the brake can be applied or released by the movement of the switch member 39ª, as in the construction shown in Fig. 2, but a graduated braking action always coextensive with the amount or degree of movement of switch member 39ª is here obtained, regardless of any inequalities or wear which may take place in any of the parts of the brake. This will be understood from the fact that the pressure which is transmitted by the brake rod to the link 13 is equaled by the pressure which is stored in the spring 38, and in the event that a certain braking action is obtained initially with a movement of the switch arm to a certain predetermined position, the same braking action will always be obtained by the movement of the switch arm to the same position, even though the parts may wear, for with this construction, the position of the switch does not determine so much the amount of brake rod movement, as the degree of braking action, for with the switch moved to a certain position, the motor will continue to operate in the direction to apply the brake until certain predetermined energy is stored in the spring, or until a like amount of pressure is transmitted through the brake rod to link 13, although the movement of the brake rod required to accomplish this may be greater after the parts of the brake are worn somewhat, or after certain inequalities in the braking apparatus are created, than was the case before such wear or inequalities occurred. In other words, with this arrangement, the operator is assured, (assuming that the spring does not weaken) that, by a movement of the switch arm to a certain position, a certain predetermined braking action will be obtained and not merely a certain predetermined brake rod movement.

In the drawings I have shown one particular type of motor, but other types may be employed, and in fact as far as certain features of my invention are concerned, other than a rotary motor may be utilized. Therefore in the appended claims, the word "motor" is used in its broad sense, as covering any suitable motive means.

Having thus described my invention, what I claim is:

1. In combination with a movable brake member, a reversing electric motor for operating the brake member, said motor having two field circuits, and switching mechanism for controlling the direction and extent of motor movement, said switching mechanism including a hand-operated member for controlling either of said field circuits of the motor, and a motor actuated member for controlling the extent of motor movement.

2. In combination with a movable brake member, a motor connected to said brake member for operating the same, said motor having two oppositely wound field windings, switching mechanism for controlling the starting, stopping and the direction of movement of the motor, comprising a manually operable member for completing the circuit through one or the other of said field windings, and a motor actuated member for controlling the extent of movement of the motor in either direction.

3. In combination with a movable brake member, a motor for actuating the same, switching mechanism for controlling the starting and stopping of the motor, said mechanism comprising a manually operable element and a traveling motor actuated member, and means by which said member is caused to stop the motor when a predetermined brake pressure is reached.

In testimony whereof, I hereunto affix my signature in the presence of two witnesses.

GEORGE R. WADSWORTH.

Witnesses:
 A. J. HUDSON,
 A. F. KWIS.